UNITED STATES PATENT OFFICE.

JOHN FINDLEY RIGGS, OF FREMONT, TERRITORY OF NEBRASKA.

MANUFACTURE OF SUGAR AND SIRUP FROM SORGHUM, &c.

Specification forming part of Letters Patent No. 41,398, dated January 26, 1864.

*To all whom it may concern:*

Be it known that I, JOHN FINDLEY RIGGS, of Fremont, in the county of Dodge and Territory of Nebraska, have invented a new and useful Process for Manufacturing Sirup and Sugar from Sorghum and other Saccharine Juices; and I do hereby declare the following to be a full and exact description of the same.

My said process consists, first, in the application of an alkali to the sirup while in a moderate heated state to rectify it, as hereinafter explained; second, in a peculiar manner of washing and pressing to remove gum and the foreign matters from sugar, as hereinafter explained.

In order that others skilled in the art to which my invention appertains may be enabled to fully understand and use the same, I will proceed to describe the manner of carrying it into effect.

I run the sorghum or other saccharine juice from the mill through a filter of clean hay or straw into an evaporator of any suitable construction, where it is evaporated as rapidly as possible with as intense heat as can be generated with dry wood, removing the scum as fast as it rises and (if possible) bringing the heat up to 240° Fahrenheit as it approaches the sugar-boil. The sirup is then about the color of boiling honey. The bubbles have a glossy appearance as it approaches completion, and a white filmy scum rises, which I remove. I have ascertained by experiment that the juices of sugar-cane have no color except from the green vegetable matter which rises in the scum, and hence any reddish color which may appear in the sirup is an effect produced by the fire. As soon as the sirup has attained the proper consistency for sugar (about 45° Baumé) I draw off into a cooler, and here, while it is at a temperature of about 100° Fahrenheit, I add saleratus, soda, or other suitable alkaline substance until all the free acid is neutralized. I then add a few ounces of well-granulated sugar and put the whole mass into an open vat and place it in a warm room or near the fire, where a regular temperature of about 80° Fahrenheit can be maintained, stirring occasionally until thoroughly granulated. I then draw off the sirup (which is clear and free from all acid or green sorghum flavor) and place the sugar in a press to extract the remaining sirup.

Having discovered that there remains in the sugar a mucilage or glutinous substance more readily soluble in water than the sugar itself, I add a sufficient quantity of water to permeate the mass, and press it out quickly before the sugar has time to dissolve to any considerable extent. The effect of this is to produce a pure article of light brown sugar free from mucilage, and by repeating the same treatment three times I obtain a very pure article of white coffee-sugar. I also take sorghum, imphee, or other sirup and warm it to blood heat or more, rectify it by the use of soda or its equivalent, and manufacture sugar and sirup therefrom in the manner above described. I also take sirup that has been evaporated as above described, place it in a warm room, and granulate it by the ordinary process, drain it, and refine it by the use of water, as above described, making an article of refined coffee-sugar free from gum and other foreign matter.

My reasons for applying the alkali while the sirup is in a moderately-heated state, are, first, the alkali, coming in contact with the acid while warm, produces an effervescence, which, if a moderate heat be maintained, will work off in a short time, whereas, if the sirup be cold, it requires a period of some weeks to reach the same result; second, if the sirup be in a highly-heated state—that is to say, much beyond 190° Fahrenheit—when the alkali is applied, the effect is to so scorch the neutral salt formed by the union of the alkali and the acid of the sirup, as well as the mucilage and other foreign matter held in solution, as to impart a dingy, smoky appearance and an impure flavor in proportion to the degree of heat of the sirup at the time the alkali is applied.

I am aware that it is common to apply water to sugar for the purpose of refining it, and this therefore, I do not broadly claim. The usual system of draining the sugar after washing is too long and tedious a process, and the centrifugal apparatus which is sometimes employed to free the sugar from water is too expensive for general use among planters. In my invention the work is performed in the most quick and thorough manner with the aid of a cheese-press or other suitable press, the sugar being at once delivered in a state sufficiently dry for packing in barrels.

Having thus described my invention, what I claim as new, and desire to secure by Letters Patent, is—

1. Applying soda or other suitable alkali to the sirup while the latter is at a temperature of 100° Fahrenheit, or thereabout, for the purpose of rectifying the same, as explained.

2. Refining sorghum or other sugar by the applying of water or other suitable liquid thereto and quickly pressing out, substantially as and for the purposes explained.

JOHN FINDLEY RIGGS.

Witnesses:
CHARLES D. SMITH,
CHARLES DU BOIS.